Jan. 5, 1960
D. V. STROCK ET AL
2,919,741
COLD PIPE EXPANDING APPARATUS
Filed Sept. 22, 1955
9 Sheets-Sheet 1
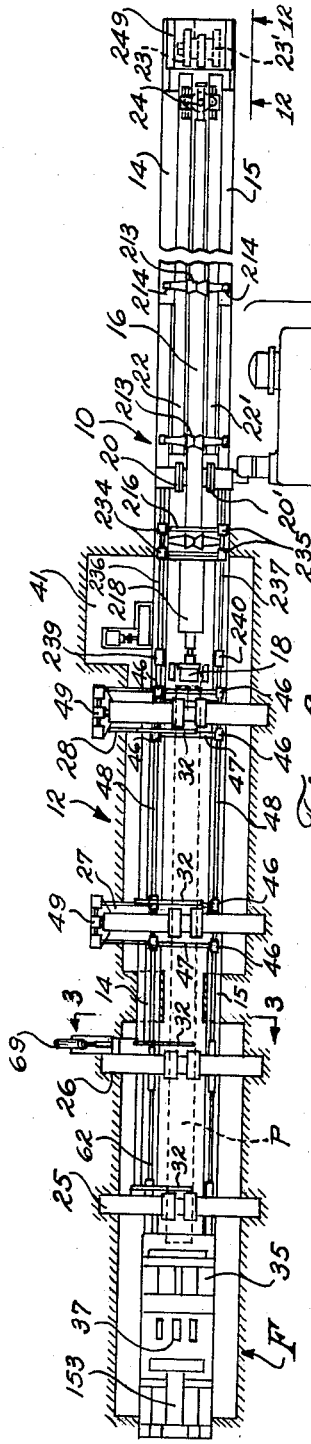
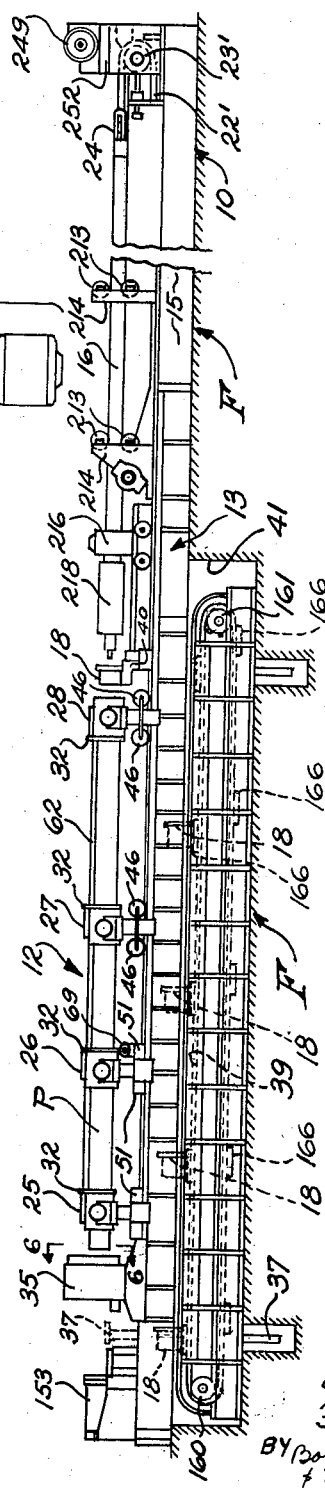
INVENTORS
DONALD V. STROCK,
GEORGE E. MOORE,
ALBERT T. SCHMIDT &
JOSEPH P. WADLECK.
BY Bosworth Sessions Herrström
& Lawler
ATTORNEYS

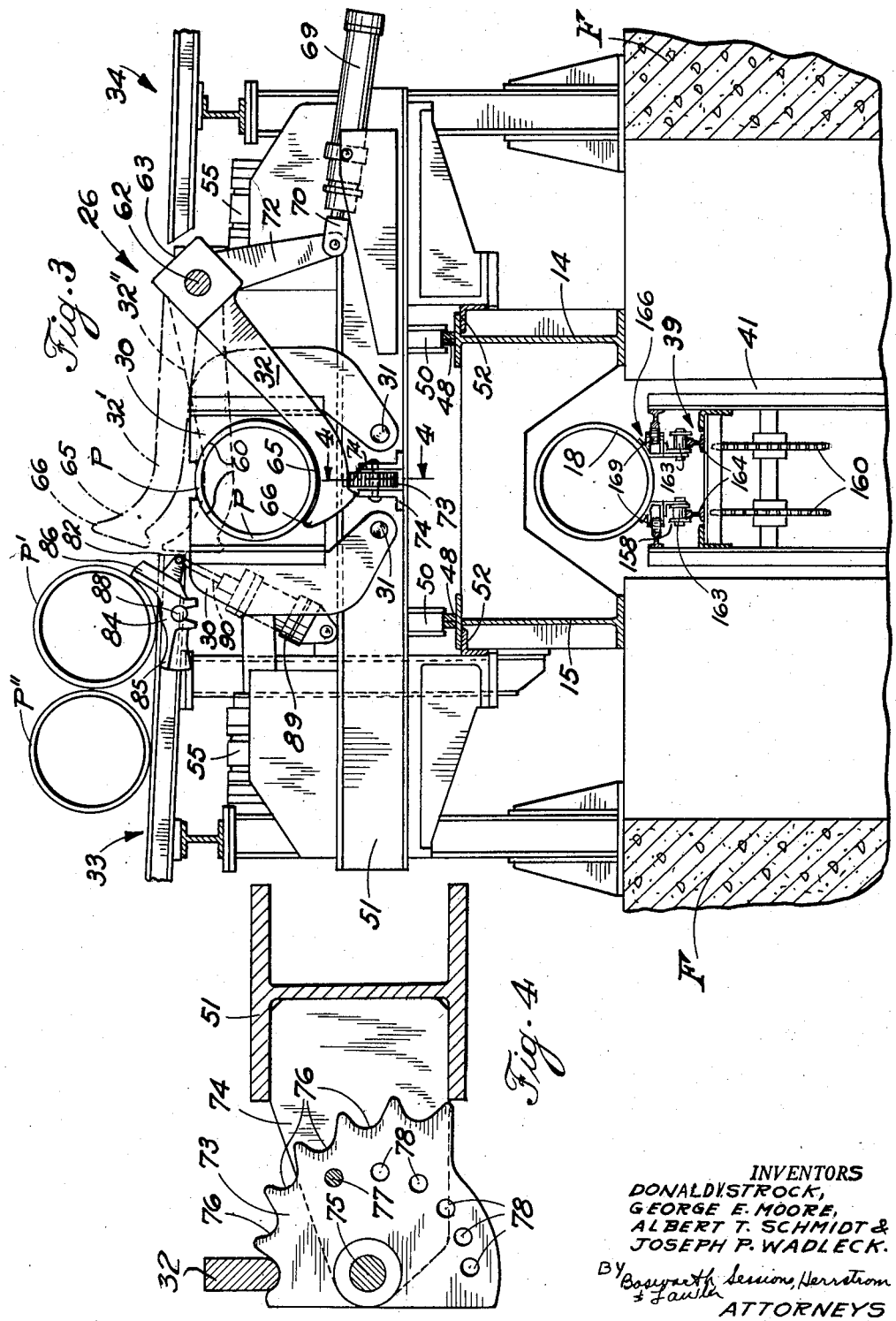

INVENTORS
DONALD V. STROCK,
GEORGE E. MOORE,
ALBERT T. SCHMIDT &
JOSEPH P. WADLECK.
BY Bosworth Sessions Herrstrom
 + Lawler
ATTORNEYS

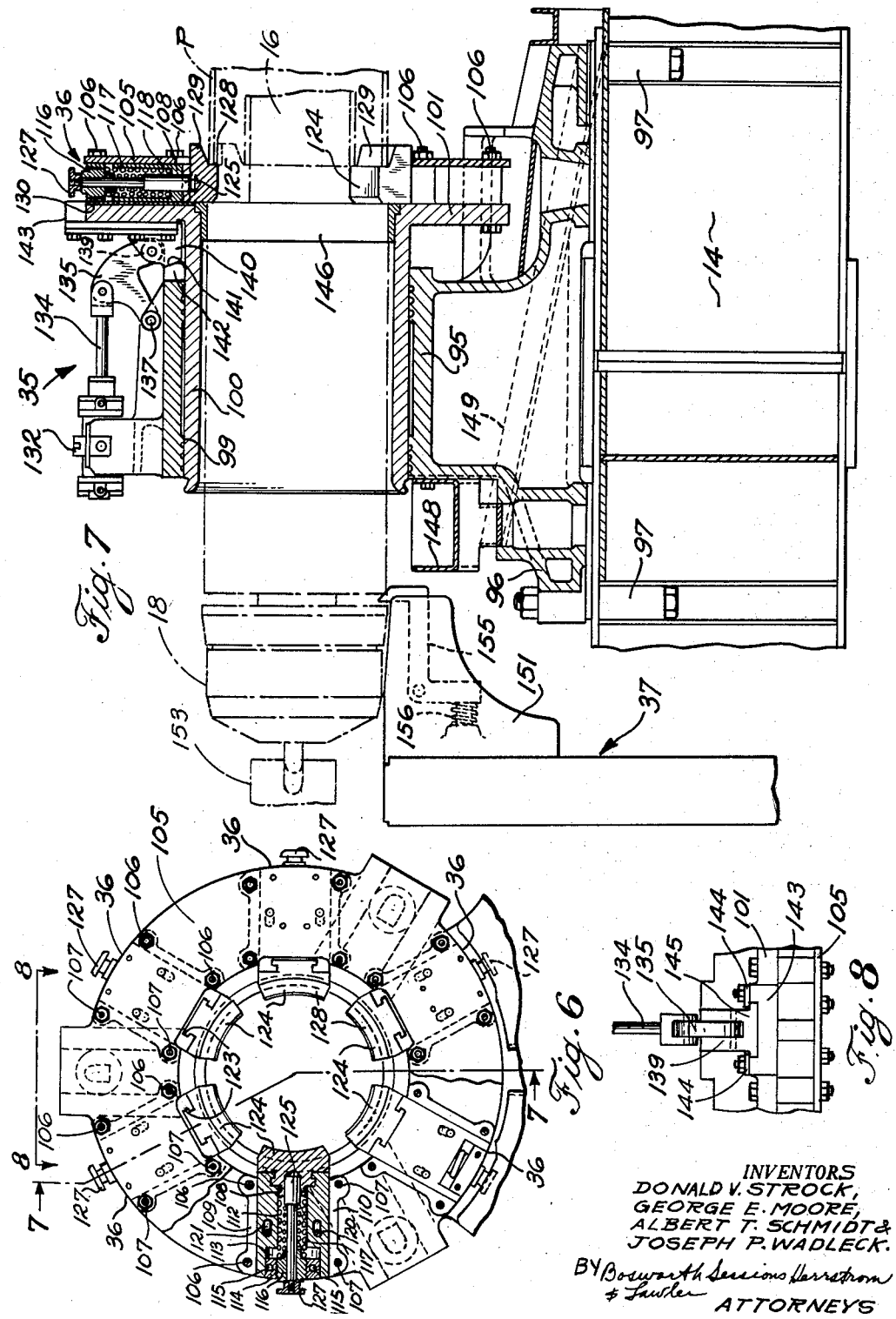

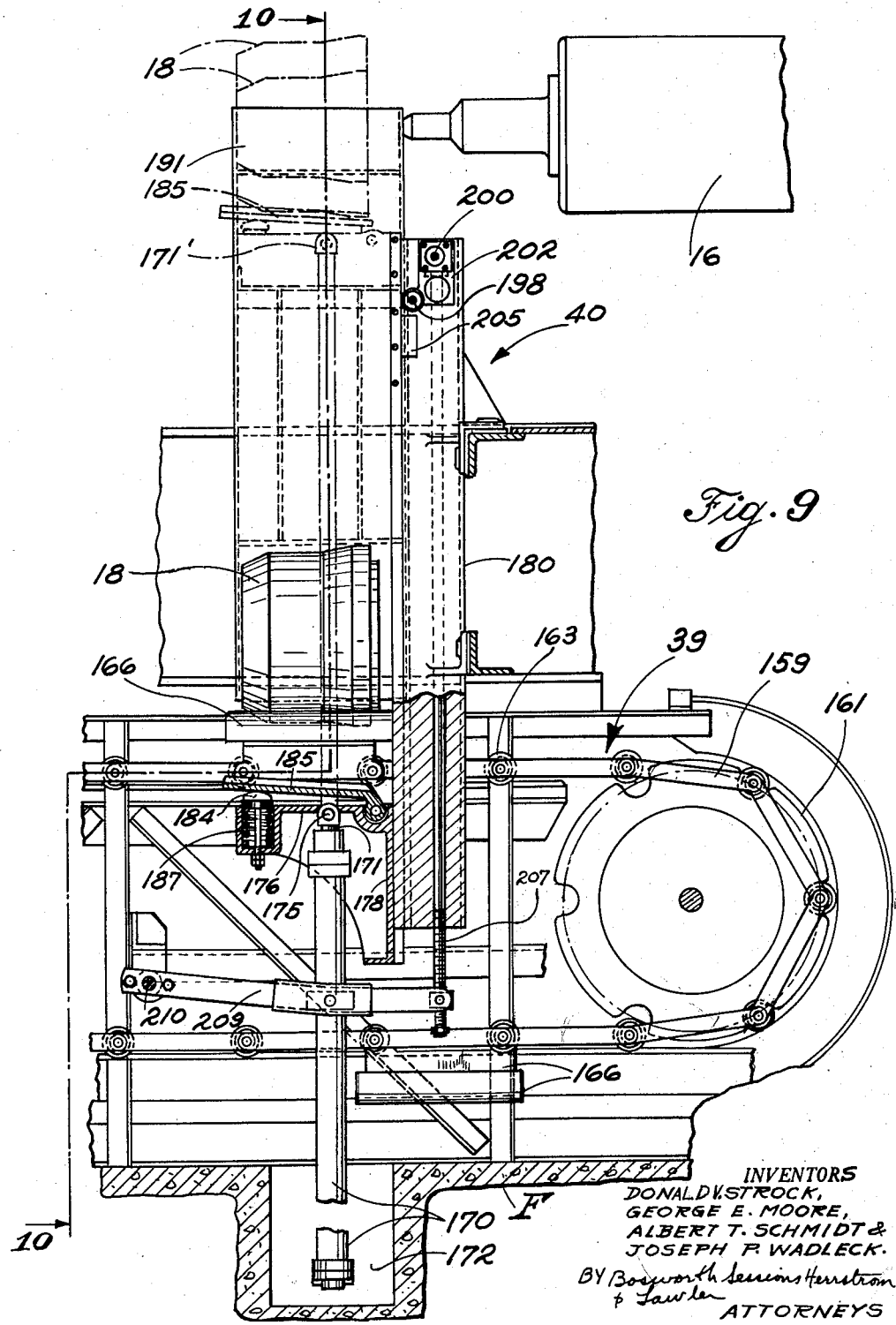

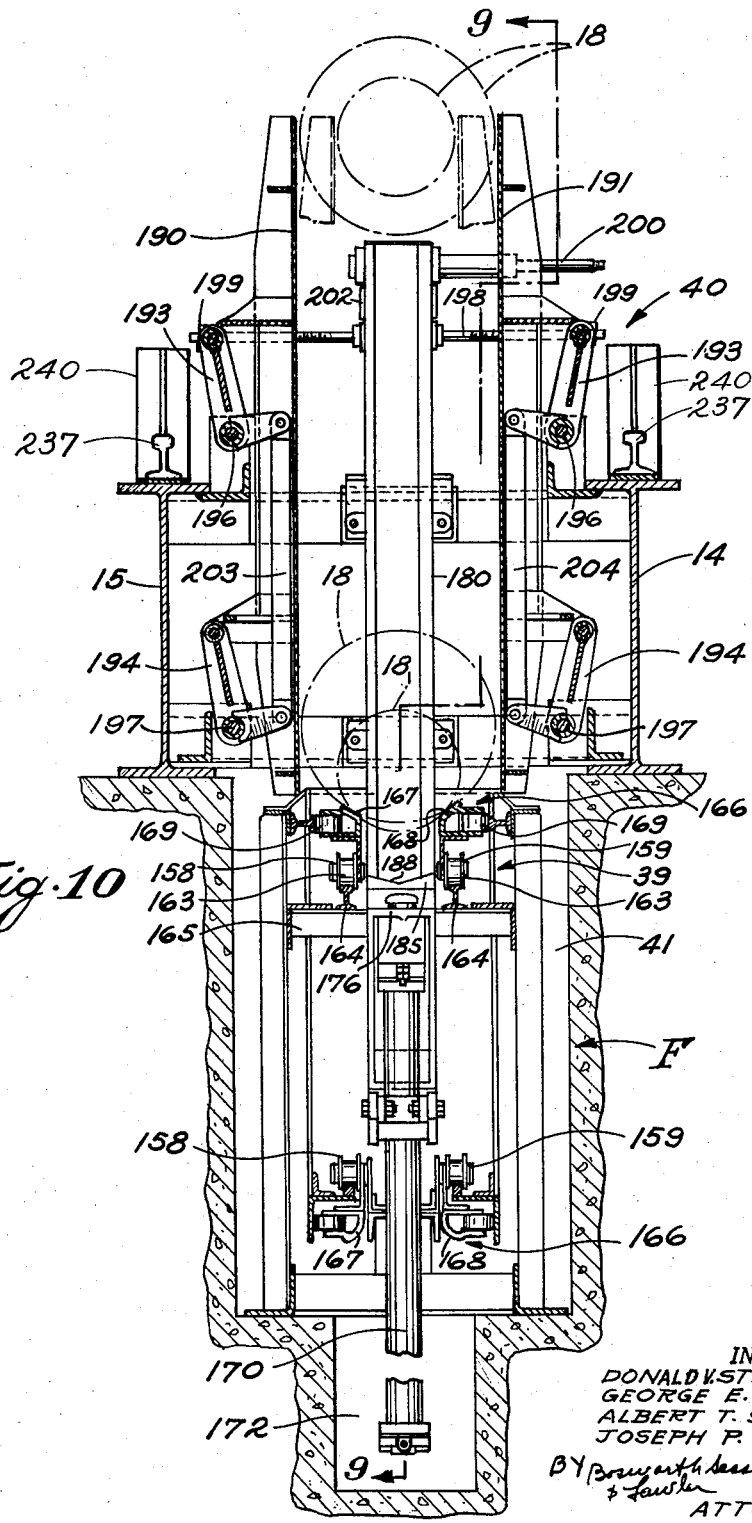

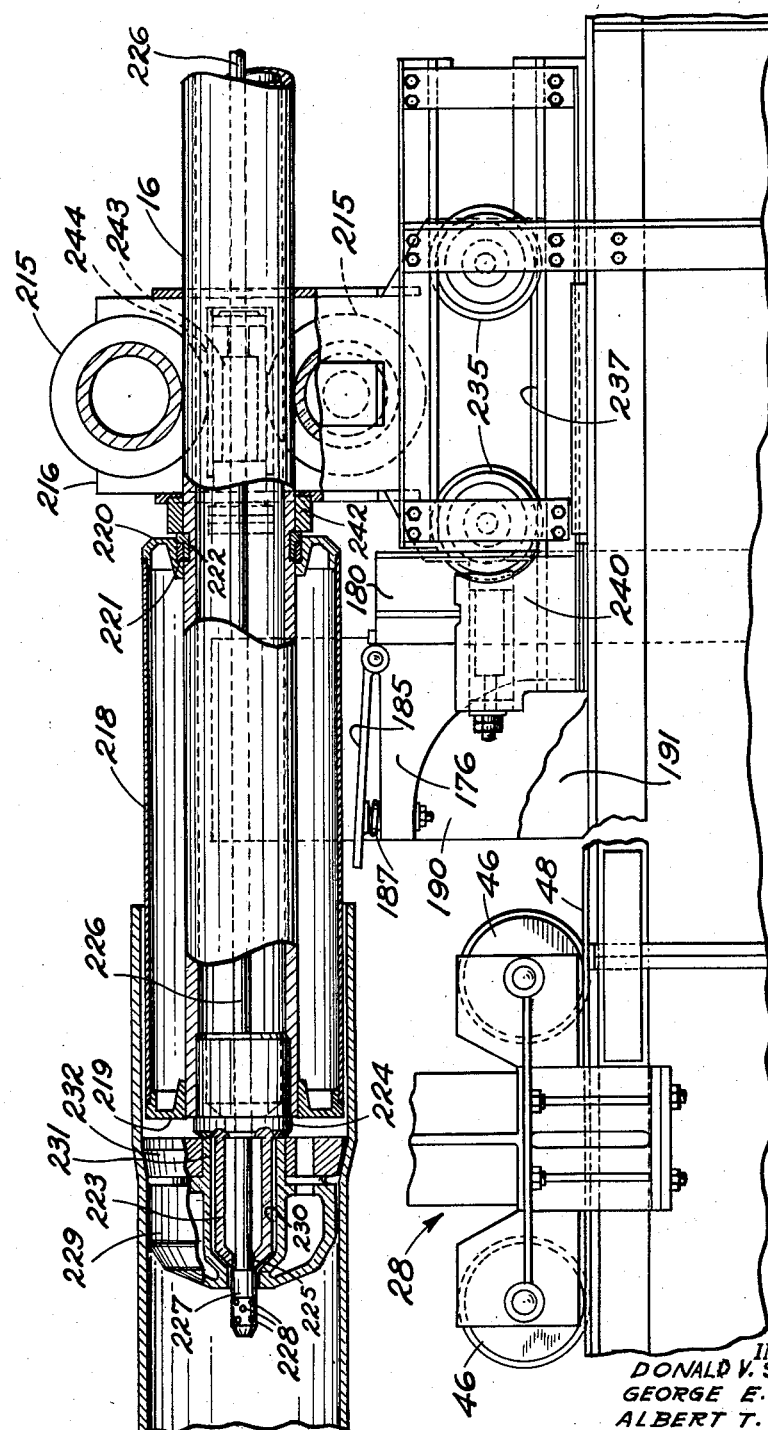

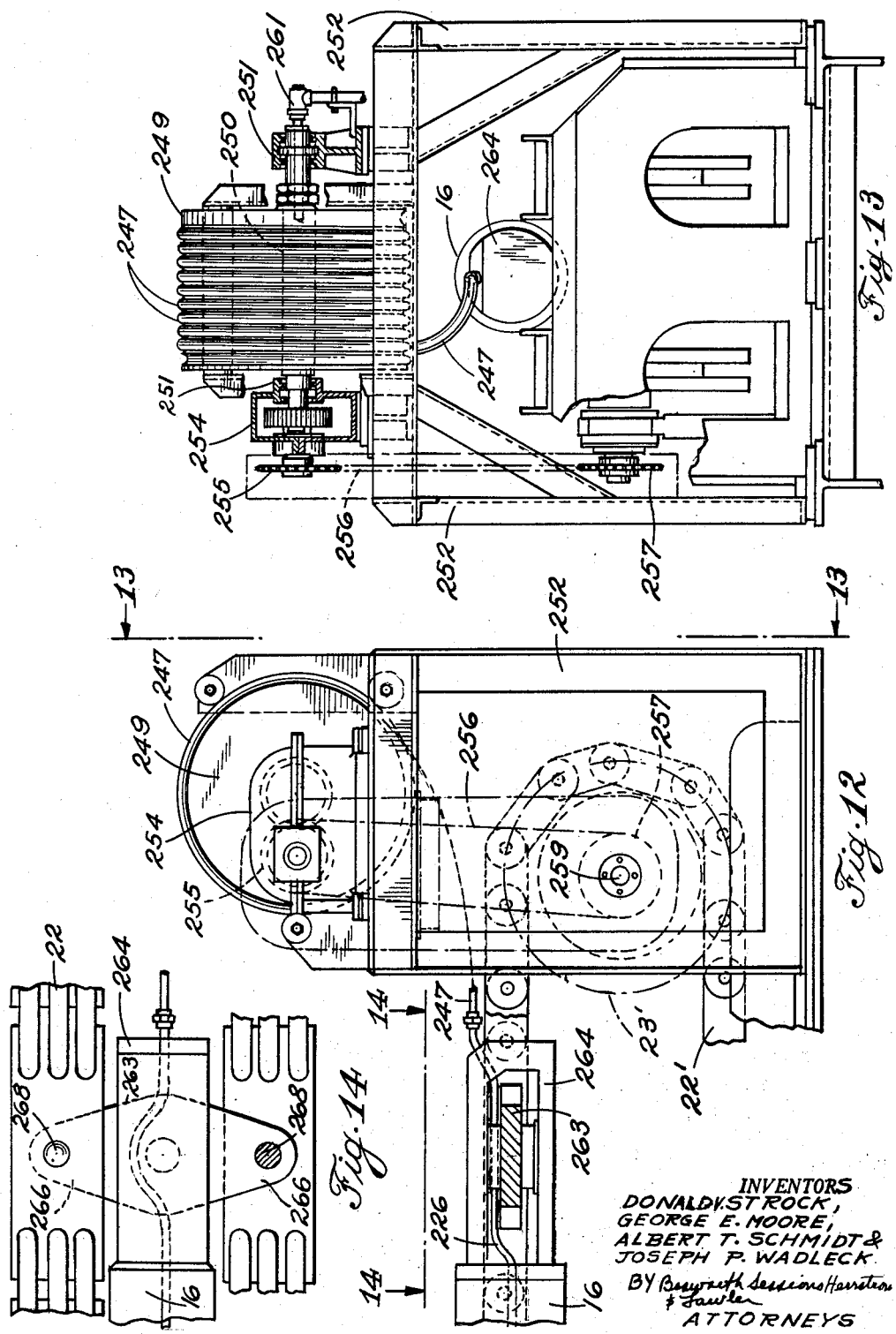

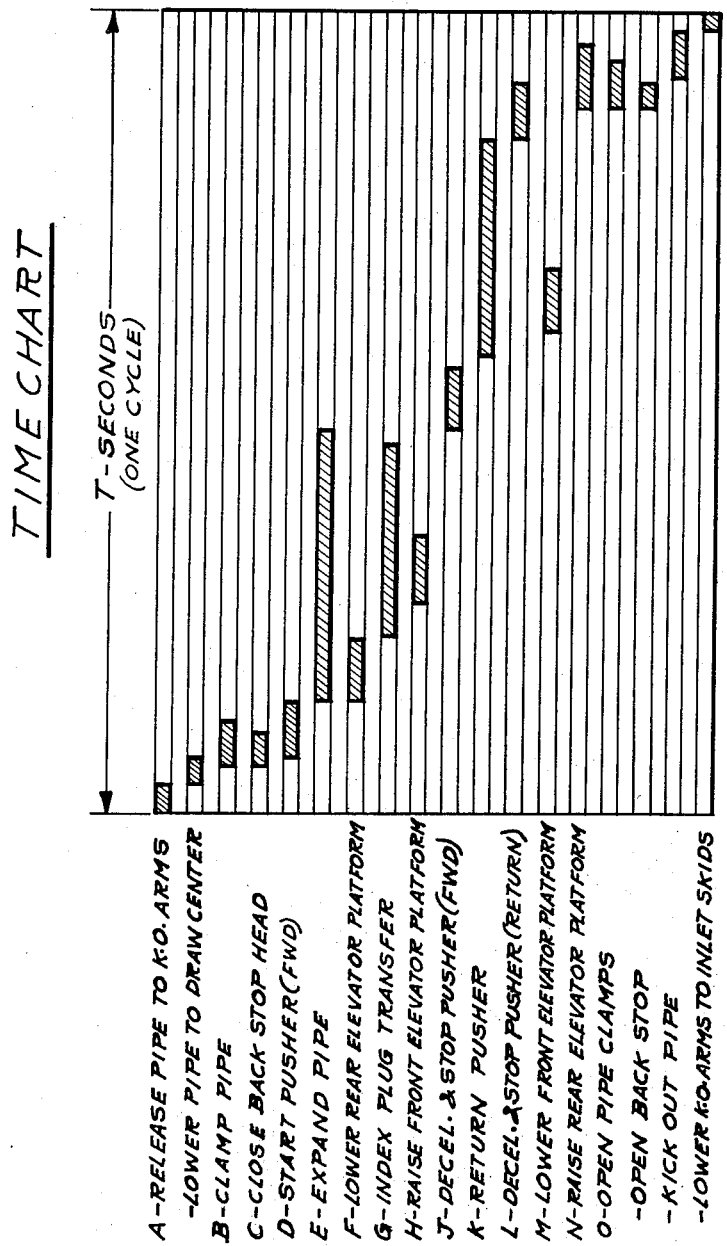

United States Patent Office 2,919,741
Patented Jan. 5, 1960

2,919,741

COLD PIPE EXPANDING APPARATUS

Donald V. Strock, Poland, Ohio, and George E. Moore, Pittsburgh, Albert T. Schmidt, Laurel Gardens, and Joseph P. Wadleck, Ellwood City, Pa., assignors, by mesne assignments, to Blaw-Knox Company, Pittsburgh, Pa., a corporation of Delaware Application September 22, 1955, Serial No. 535,982

14 Claims. (Cl. 153—80.5)

This invention relates to seamless pipe making apparatus and more particularly to an apparatus for expanding lengths of seamless pipe of relatively large diameter.

Several methods have been proposed for expanding pipe, that is, increasing the diameter of a length of pipe. According to one such method, the pipe is heated and an expander die head having a diameter greater than the inside diameter of the pipe is pulled through the entire length of the pipe by a draw bar or chain connected to the die head. This method requires the die head to be coupled to and uncoupled from the draw bar at the beginning and end of each cycle of operation with resultant delays and hence a low output capacity of the machine and additionally requires several operators for the sole purpose of coupling and uncoupling the die head.

According to another method, the die head is reciprocated through a short stroke in the pipe and expands an increment of the length of the pipe on one stroke and feeds the pipe through the machine on the return stroke. Such step-by-step expansion of the pipe is not only slow but also leaves undesirable wrinkles in the pipe.

According to the present invention an expander die or plug is pushed in one direction continuously through the entire length of a cold pipe by a fast moving ram-like pusher bar; the pipe being expanded by internal pressure against the pipe shell. The plug is disconnected automatically from the pusher bar as the latter retracts on its return stroke and is transferred by a conveyor under the machine to the starting point; preferably, several plugs are employed in the apparatus so that a plug is always available at the starting point whenever a pipe is in position to be expanded. After the pusher bar is retracted, the expanded pipe is removed from the apparatus, a fresh pipe is loaded in the machine, and the cycle is repeated. The diameter of the pipe is increased, for example, from 2% to 6%. The prime purpose, however, is that the cold working improves the physical properties of the pipe, giving uniform high strength without necessitating the addition of manganese or other alloying constituents to the metal. Thus, readily weldable pipes of low carbon alloy and having uniform, high strength are produced.

A general object of our invention is the provision of an apparatus for rapidly and efficiently expanding and cold working pipe. Another object is the provision of an apparatus that is adapted to hold a cold pipe stationary and to expand it by pushing an expander plug through the entire length of the pipe in one rapid and continuous motion. Another object is the provision of such a pipe expanding apparatus in which the expander plug is automatically connected to and disconnected from a push bar at the beginning and at the end, respectively, of the expanding operation. Another object is the provision of pipe expanding apparatus embodying a reciprocable push bar and a plurality of expander plugs, one of which is ready for entry into a fresh pipe as soon as the push bar is returned to its starting position. Another object is the provision of means for supporting a long piece of pipe in the expanding apparatus so that buckling of the pipe is prevented when an expander plug is pushed through the pipe. A further object is the provision of an apparatus embodying means for rapidly loading fresh pipe into and removing expanded pipe from the top of the machine. Another object is the provision of an apparatus in which automatically the lengths of pipe are held straight immediately prior to the beginning of the pipe expanding operation in order to prevent buckling of the pipe while being expanded. Still another object is the provision of an expandable backstop for holding the pipe against longitudinal movement during the expanding operation and which permits the expander plug to pass through the backstop. A further object is the provision of a backstop which automatically releases the adjacent end of the pipe after the expanding operation to permit the pipe to be lifted out of the expanding machine. A further object is the provision of an apparatus embodying means for automatically lubricating the expander plug during the pipe expanding operation. Another object is the provision of an apparatus in which the push bar is supported against binding and buckling, especially during the pipe expanding operation when the bar is subjected to large compressive forces.

The mode of attainment of these and other objects of our invention will appear from the following description of a preferred embodiment thereof, reference being had to the accompanying drawings, in which:

Figure 1 is an elevation of the pipe expanding apparatus showing a length of pipe in the apparatus and the pusher bar and expander plug in their starting positions at the beginning of the pipe expanding operation. The pipe loading and unloading skids are omitted for sake of clarity.

Figure 2 is a top plan view of the apparatus shown in Figure 1.

Figure 3 is an enlarged transverse section through the apparatus showing one of the pipe clamping stations, the pipe lift arm and the pipe entry and exit skids (omitted from Figures 1 and 2), the section being taken on line 3—3 of Figure 2.

Figure 4 is an enlarged section showing an adjustable rest for the pipe lift arm, the section being taken on line 4—4 of Figure 3.

Figure 6 is an enlarged rear end view of the pipe backstop at the exit or front end of the machine, the view being taken along line 6—6 of Figure 1.

Figure 7 is a longitudinal section of the backstop taken on line 7—7 of Figure 6.

Figure 8 is a fragmentary plan view of the backstop showing the connection of the actuating linkage to the retractable part of the backstop.

Figure 9 is a central vertical section of the rear expander plug elevator mechanism at the entry end of the pipe and showing the elevator platform in the lower position, the section being taken on line 9—9 of Figure 10.

Figure 10 is a transverse section taken on line 10—10 of Figure 9.

Figure 11 is an elevation, partially in section, of the travelling carriage for supporting the front end of the pusher bar.

Figure 12 is an elevation, partially in section, of the rear end of the push bench showing the connection of the push bar to the drive chain and showing the lubricant hose and reel, the view being taken on line 12—12 of Figure 2.

Figure 13 is an elevation, with parts broken away, showing the drive for the plug lubrication hose reel, the view being taken as indicated by line 13—13 of Figure 12.

Figure 14 is a plan view of the connection between the end of the pusher bar and the drive chain, the view being taken on line 14—14 of Figure 12.

Figure 15 is a time chart showing the time relationship and sequence of operations of the apparatus for a complete cycle.

Figure 5:
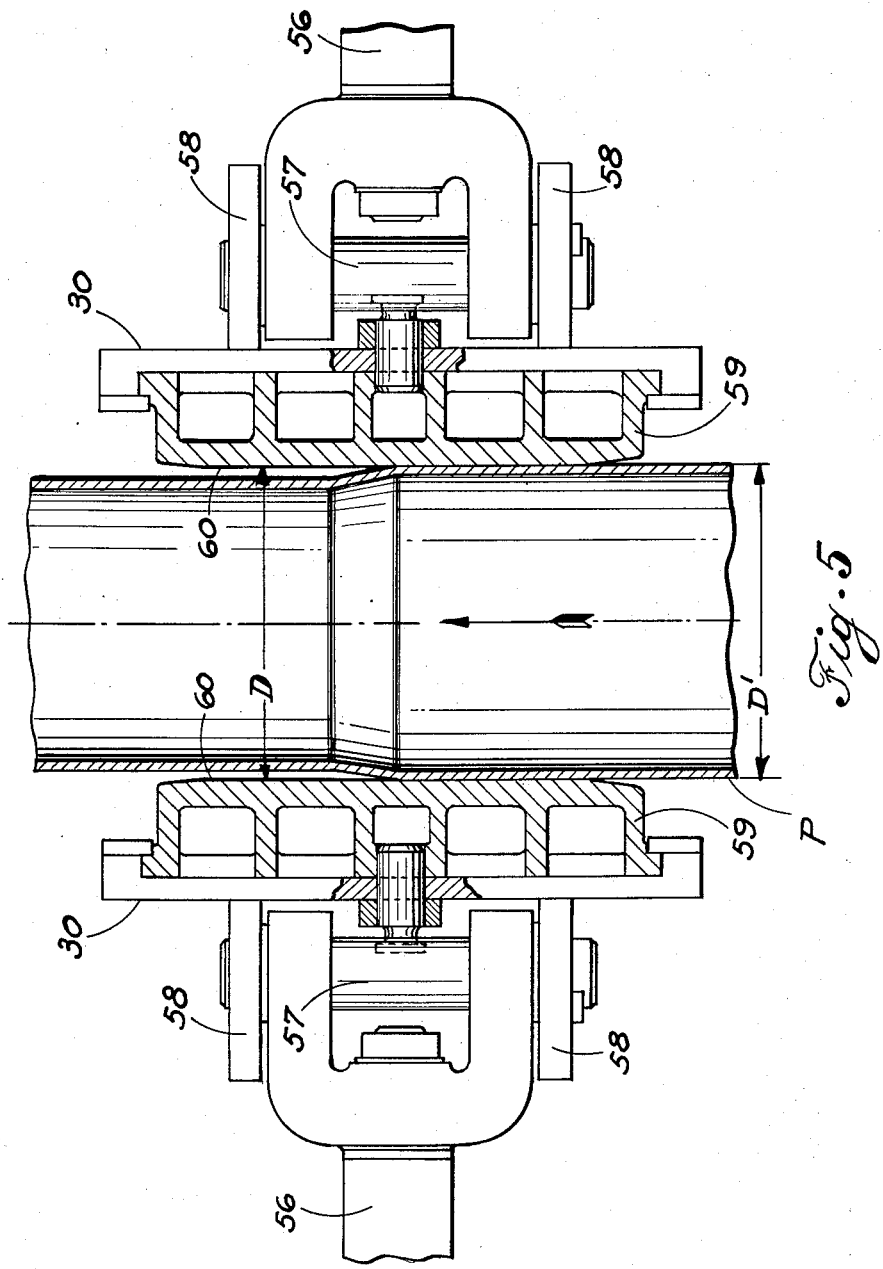
Figure 5 is a greatly enlarged horizontal section through one of the sets of pipe clamping jaws illustrating schematically the manner in which the pipe is clamped.

*General arrangement.*—As shown in Figures 1 and 2, a preferred form of cold pipe expanding apparatus embodying the invention may comprise a push bench indicated generally at 10 and a pipe expander table 12 adjacent one end of and longitudinally aligned with the push bench. The push bench and expander table are supported on an elongated base 13 comprising a pair of laterally spaced parallel base frames 14 and 15, each of which is made of I beams welded together throughout the entire length of the machine and anchored to a foundation F.

In order to expand a length of pipe P positioned on the expander table, an elongated push bar or tube 16 is supported on the push bench 10 for longitudinal reciprocating movement. The push bar is arranged to force a pipe expander die or plug 18 through the entire length of the pipe in one continuous stroke. Power to drive the push bar 16 is furnished by a reversible variable speed motor and speed reducer 19, which rotates dual drive sprockets 20, 20' on the front end of the push bench. In describing the apparatus, the left end of the apparatus as viewed in Figures 1 and 2 is referred to as the front end of the apparatus and of components thereof, and the right end as viewed in Figures 1 and 2 is referred to as the rear end. Movement of the push bar from right to left is termed forward movement, and movement in the opposite direction, from left to right as viewed in the drawings, is designated as rearward movement. The sprockets drive a pair of endless chains 22, 22' which pass around dual idler sprockets 23, 23' at the rear end of the push bench 10.

Push bar 16 is connected at its rear end to the upper lengths of drive chains 22, 22' as shown at 24, see also Figures 12 and 14, and is driven forwardly on the pipe expanding stroke and rearwardly on the return stroke by the motor and gearing 19, through the drive sprockets 20, 20' and these chains. On the working or expanding stroke, the front end of the push bar picks up a pipe expander plug 18 and pushes this plug through the entire length of the pipe P on the expander table. On the return stroke, plug 18 is stripped from the front end of the push bar, which then returns to its starting position as shown in Figures 1 and 2.

The pipe P is held on the expander table by massive, longitudinally spaced clamps 25, 26, 27 and 28, see also Figures 3, 4 and 5; clamps 25 and 26 are longitudinally fixed on the base 13, while clamps 27 and 28 are longitudinally adjustable along the base to permit clamping of different lengths of pipe. The pipe clamping parts of these four clamps are substantially identical in construction and mode of operation, each clamp having a pair of jaws 30, see Figures 3, which are pivoted at their lower ends as at 31 so that pipe can be loaded on and removed from the expander table through the tops of the clamps when the jaws are opened. Loading and unloading of the pipe is accomplished by lift arms 32 associated with each clamp, which receive the unexpanded pipe from entry skids 33 on one side of the machine and discharge the expanded pipe to exit skids 34 on the opposite side of the machine.

The compressive forces developed in pipe P during the expanding operation are opposed by a stationary back stop 35, see also Figures 6, 7 and 8, located adjacent the front end of the expander table and against which the front end of the pipe abuts. Back stop 35 carries pipe engaging elements 36 which expand radially to permit the front end of the pipe to expand and to permit passage of the expander plug 18 through the back stop. The elements 36 also are axially retractable for a short distance to provide a clearance for the front end of the pipe to permit the expanded pipe to be lifted out of the apparatus by the arms 32 without being moved lengthwise.

When the push bar 16 is withdrawn from the pipe after the pipe expanding stroke has been completed, the plug 18 is stripped from the front end of the push bar and is deposited on an elevator or transverse conveyor 37 located in front of the backstop 35. The plug is lowered by the elevator to a chain conveyor 39 below the expander table 12 which transfers the plug to a similar elevator or transverse conveyor 40 at the rear end of the expander table. Elevator 40 lifts the plug from the conveyor to the position shown in Figure 1 in alignment with the retracted push bar and ready for another pipe expanding operation. The conveyor 39 preferably is located in a recess 41 in the foundation F. In practice, several plugs are used in the machine to speed up the operation, five plugs being shown in the drawing. Of these, four are in transit to the starting point at any one time during the cycle of operation. The use of several plugs not only insures that a plug will be available at the starting point when needed, but also gives the plugs additional time for cooling.

*Pipe clamping and loading mechanism.*—Each of the pipe clamps 25, 26, 27 and 28 and its associated operating mechanism is supported on the base frame members 14 and 15. In order to provide longitudinal adjustment of movable pipe clamps 27 and 28 along the base members 14 and 15, wheels 46, see Figures 1 and 2, are mounted on axles 47 carried under the clamps and ride on rails 48 on the top of the base members. The wheels 46 are driven through suitable connections by means of motors 49 on the outboard sides of the clamps 27, 28 to provide power for shifting the clamps to accommodate different lengths of pipe. Fixed clamps 25 and 26, see Figure 3, are supported by vertical support blocks 50 which depend from transverse clamp beam 51 and engage rails 48. Beam 51 has a pair of angle members 52 which are welded to base frame members 14 and 15 to secure the clamps 25 and 26 in a longitudinally fixed position.

The jaws 30 of each of the pipe clamps comprise identical movable segments symmetrically arranged around the pass line of the expander plug, each jaw segment being pivotally supported at its lower end on beam 51 by a pin 31, see Figure 3, and being actuated to pivot inwardly and outwardly by a hydraulic motor in the form of a cylinder and piston mechanism 55 having a reciprocable arm 56 provided with a yoke, see Figure 5, connected by pin 57 to ears 58 on the upper part of the segment. The pair of clamp actuating motors 55 for each clamp is connected to high pressure hydraulic lines and the motors of each pair are operated simultaneously to clamp and unclamp the pipe. In order progressively to align an unexpanded pipe with the pass line of the plug and to hold the pipe on a straight line, the pairs of jaws at the four clamps are closed sequentially, that is, the jaws at clamp 27 close immediately after the jaws at clamp 28 close, and clamps 26 and 25 close successively thereafter.

Each clamp jaw 30, see Figure 5, has a removable arcuately shaped pipe engaging shoe 59 with a curved surface 60 conforming generally to the outer surface of the particular size of pipe being expanded. Preferably, the diametric spacing D between surfaces 60 of clamp shoes 59 when the jaws are closed is substantially equal to or slightly greater than the outside diameter D' of the expanded pipe. When an unexpanded pipe is placed in the machine between the opened clamps, the axis of the pipe, if bent, will not coincide with the longitudinal axis of the clamp shoes and so the clamps, on closing, progressively engage the pipe and tend to hold it straight. For a theoretically straight pipe, as illustrated in Figure 5, the inner faces 60 of clamp shoes 59 are spaced from the unexpanded outer surface of the pipe by an amount corresponding to the radial expansion to be effected in the pipe. As the expander plug 18 passes through the pipe in the direction of the arrow in Figure 5 and expands it, the diameter to which the outside of the pipe is expanded substantially corresponds to the diametric spacing of the inner surfaces 60 of the closed shoes.

An alternate method of clamping or holding the pipe on a straight line consists of initially closing the shoes at each clamp so that the diametric spacing of the shoes corresponds to the unexpanded diameter of the pipe. As the expander plug, in its travel through the pipe, approaches each pipe clamp, a limit switch, not shown, is actuated to effect partial release of fluid from the hydraulic motor 55 for that clamp, and the clamp shoes automatically retract to the expanded diameter of the pipe. This permits the plug to pass through the clamp. These limit switches may be longitudinally adjustably mounted on the push bench frame adjacent the push bar drive chains for actuation at the proper time by suitable projection means on the moving chains.

In order to lower unexpanded pipe into and to remove expanded pipe from a position between the clamp jaws 30, lift arms 32, see Figures 1, 2 and 3, adjacent the clamps are mounted on a longitudinally extending rock shaft 62 journalled in bearings on upstanding plates 63 which are supported on the transverse beam 51 at each clamp. Lift arms 32 associated with movable clamps 27 and 28 are adjustable longitudinally along shaft 62. The top edge 65 of the lift arm remote from rock shaft 62 is concave and terminates in an upwardly projecting lip 66 which forms a seat for retaining a pipe on the arm when the latter is raised and lowered. The part of top edge 65 of the arm adjacent the rock shaft is flat as shown.

Shaft 62 is rocked about its axis to raise and lower the four lift arms 32 by means of a hydraulic cylinder and piston mechanism 69, see Figure 3, the piston rod 70 of which is pivotally connected to a lever 72 secured to the rock shaft. Since all of the lift arms are connected to shaft 62 and are operated in unison, only one motor 69 is provided. As piston rod 70 moves out from the cylinder, to the left as viewed in Figure 3, rock shaft 62 is pivoted in a clockwise direction and raises the lift arms 32 from the lower position indicated in full line in Figure 3 to the extreme upper or pipe discharge position shown in broken line at 32'. It will be noted the flat upper edge of the arm in the discharge position 32' inclines to the right as viewed in Figure 3 so that pipe on the arm can roll by gravity from the lift arms. The lift arms 32 also have an intermediate upper or pipe loading position, indicated in dotted lines at 32", in which position the top of lip 66 of each arm is even with entry skid 32 and the flat upper edge of the arm is inclined to the left as viewed to prevent the pipe from rolling to the right out of the concave seat 65.

In order to limit downward movement of the lift arms, an adjustable stop 73 is mounted by brackets 74 on the transverse beam 51 of one of the clamps between clamp jaw pivot pins 31 and below each lift arm 32. As shown in Figure 4, each stop 73 comprises a segmental eccentric plate pivoted for movement about a transverse pin 75 and having a series of peripheral recesses 76 radially spaced at progressively greater distances from pin 75. The lower portion of lift arm 32 is adapted to engage in the uppermost one of the recesses 76. The angular position of plate 73 is adjusted so that uppermost notch 76 supports the lift arm in the proper position for the diameter of the pipe being expanded. The plate is locked in position by lock pin 77 which extends through one of several lock holes 78 in the plate and through brackets 74.

Unexpanded pipe is rolled into loading position on the entry skids 33, see Figure 3, located along the side of the expander table 12 opposite the rock shaft 62 and directly above the clamp jaw segments on that side of the table. Skids 33 preferably comprise a plurality of longitudinally spaced transverse rails which incline downwardly toward the clamp jaws and have their inner ends 82 immediately adjacent the path of movement of lips 66 of the several lift arms 32.

In order to prevent lengths of pipe from inadvertently rolling off the inner ends of skids 33, two or more longitudinally spaced pipe stop and release levers 84 are mounted near the ends of the skids. Each lever has angularly projecting legs 85 and 86, and the levers are secured to a common longitudinal shaft 88 which is rocked about a horizontal axis by a fluid pressure cylinder 89 mounted on the pipe clamp frame and having a movable piston arm 90 connected to the lever. Thus, each lever 84 may be rocked between the position shown in Figure 3, with leg 86 projecting above the skid rails to prevent pipes P' and P" from rolling off the skids, and a position in which leg 86 is lowered and leg 85 is raised. In order to feed one pipe to lift arms 32 when the latter are in the loading position shown at 32", the levers 84 are rocked by motor 89 in a clockwise direction, causing leg 86 to move down and leg 85 to move up, thus simultaneously permitting pipe P' to roll onto lift arms 32 and blocking the next pipe P". After the lift arms have been loaded, the levers 84 are returned to the position shown in Figure 3 and the skids 33 are ready to discharge another pipe into the machine. Lift arms 32 then lower the pipe between the open clamp jaws, the clamps are closed and the pipe is expanded.

After the pipe has been expanded and the push bar has been withdrawn from the pipe, the clamp jaws are opened, lift arms 32 are raised to the extreme upper position 32' and the expanded pipe rolls down the inclined upper edge of the lift arm to the exit skids 34 adjacent the lift arm rock shaft 62. The top plane of the exit skid rails is inclined downwardly to the right as viewed, and the expanded pipe rolls transversely from the machine.

*Pipe backstop mechanism.*—As mentioned above, clamps 25, 26, 27 and 28 serve primarily to hold the pipe on the axis of the expander plug pass line. The grip of these clamps on the pipe is not intended to be sufficient to prevent longitudinal movement of the pipe relative to the expander table during the expanding operation. Accordingly, backstop 35, against which the front end of the clamp pipe abuts, is provided at the front end of the expander table to resist the very great longitudinal thrust exerted on the pipe during the expanding operation.

Backstop 35, see Figures 6, 7 and 8, comprises a heavy walled, generally cylindrical, open ended frame 95 having a base 96 rigidly secured to the base frames 14 and 15 of the machine by heavy bolts 97. Slidably telescoped within the central bore 99 of the backstop frame 95 is a cylindrical sleeve 100 having an inside diameter slightly greater than the maximum diameter of the largest expanded plug 18 which the machine is designed to use and having an annular, outwardly extending, integral rear flange 101 adjacent and outside the rear of frame 95. Sleeve flange 101 supports a plurality of radially expandable elements 36, the inner ends of which are engaged by the front end of the pipe. Means, described below, are provided for reciprocating sleeve 100 together with elements 36 axially within the backstop frame 95 in order to provide clearance to permit unloading of the expanded pipe.

Elements 36, six of which are shown in the preferred embodiment of the invention, are equi-angularly spaced on the rear face of flange 101 and are secured thereto by a rearwardly spaced disc-like plate 105 secured to the flange by bolts 106 and 107. The elements 36 are substantially identical assemblies, each comprising a plunger 108, preferably rectangular in cross-section and radially slidable within a pair of guide members 109 and 110 which are secured between mounting plate 105 and flange 101 by the bolts 106 and 107. Plungers 108 each have a central bore 112 with a countersunk recess 113 in its outer end, in which a stationary nut 114, fixed by screws 115 to sleeve flange 101, is disposed. A collar 116 threaded into nut 114 constitutes a stationary abutment for a heavy compression spring 117 disposed concentrically within bore 112 and engaging at its inner end a shoulder 118 on the plunger. Thus spring 117 resiliently urges the plunger 108 radially inwardly with respect to sleeve flange 101, and radial movement of the plunger is limited by fixed guide pins 120 which extend through radially elongated slots 121 in the plunger wall, pins 120 engaging the outer end of slots 121 when the plunger is urged to its inner limit of movement by spring 117.

The inner face of each plunger 108 is formed with a dovetail recess 123 by which an arcuate pipe engaging shoe 124 is removably secured to the plunger. The curvature and radial dimensions of the shoes correspond to the diameter of the pipe being processed, and shoes of different size are interchangeably mounted on the pistons for different sizes of pipe. In order to lock the shoe 124 on the plunger, a spring loaded lock pin 125 supported within the plunger extends into the shoe. Lock pin 125 may be retracted from engagement with the shoe by an exterior knob 127 connected to the outer end of the pin.

The rear faces of the shoes are formed with pipe abutment seats 128, see Figure 7, having arcuate bevelled outer shoulders 129 which guide the front end of a clamped pipe onto the seat. During the expanding operation, the front end of the pipe P, indicated in broken line in Figure 7, engages the seats 128 of elements 36 with great force; and while these elements are subjected to the thrust load, the plunger 108 is expanded radially outwardly against the resistance of compression springs 117 by the expander plug 18 when it passes through the front end of the pipe and into the backstop. In order to reduce wear and friction between the sleeve flange 101 and the plungers 108, strips of bearing metal 130 are disposed between each plunger 108 and the rear face of sleeve flange 101 and are secured to the guide members 109 and 110 on opposite sides of the plungers.

As mentioned above, the expanded pipe is lifted vertically out of the machine during the unloading operation. In order to provide longitudinal clearance between the front end of the expanded pipe and shoulders 129 on shoes 124, backstop sleeve 100 and the elements 36 mounted thereon are moved forwardly relative to backstop frame 95 and away from the front end of the pipe by means of a plurality of preferably pneumatic cylinder and piston mechanisms 132, one of which is shown in Figure 7. Preferably three equally spaced mechanisms are employed. Each mechanism 132 has a rearwardly extending piston arm 134 connected to a lever 135 supported for pivotal movement about a transverse pin 137 on backstop frame 95. Lever 135 is pivotally connected to a block 139, see also Figure 8, having a base 140 which is wedged between the face 141 of a boss 142 on the rear of backstop frame 95 and sleeve flange 101 when the sleeve 100 is fully extended rearwardly as shown in Figure 6. Block 139 is radially slidably connected to the front face of sleeve flange 101 by means of a slide adapter plate 143, see Figure 8, secured to the flange 101. Block guide strips 144 secured to adapter plate 143 provide a radial guideway within which the dovetailed face 145 of locking block 139 can slide relative to sleeve flange 101.

After the pipe has been expanded and it is desired to move backstop elements 36 forwardly and away from the end of the pipe P prior to the pipe unloading operation, cylinders 132 are energized to withdraw piston arm 134 to the left as viewed in Figure 7. Lever 135 pivots in a counterclockwise direction about pin 137 and initially lifts block 139 outwardly relative to sleeve flange 101 and backstop frame 95. When the base 140 of block 139 has moved out sufficiently to clear rear face 141 of boss 142 on the backstop frame 95, continued pivoting of lever 135 moves block 139 forwardly and causes sleeve 100 to move forwardly into frame 95. As a result of this action, all elements 36 are moved forwardly and away from the front end of the pipe, providing clearance between the end of the pipe and the shoulders 129 on shoes 124. Thereafter the pipe may be lifted out of the expander table by arms 32 as described above. The cylinders 132 are actuated in the opposite direction to move the sleeve 100 and elements 36 to operative position before the next pipe length is expanded.

When the base 140 of each block 139 is wedged between the rear face 141 of boss 142 on the backstop frame 95 and sleeve flange 101, as shown in Figure 7, the thrust forces on the pipe being expanded are transmitted through the several shoes 124 of elements 36, sleeve flange 101, and block bases 140 to frame 95. Thus the thrust applied to the pipe is carried by frame 95 which, being anchored to the main base frame of the machine, provides a rigid abutment for the pipe. A reinforcing ring 146, see Figure 7, mounted within the rearward end of sleeve 100 contributes to the support of the shoes 124 against the thrust forces. Rings of different inside diameters are provided to accommodate pipes of different diameters which are expanded in the machine.

A lubricant drain pan 148 on the front end of the backstop frame 95 receives excess expander plug lubricant which is fed ahead of the expander plug as the latter is pushed through the pipe, and an inclined trough 149 carries the lubricant from the backstop to reclaiming apparatus, not shown, from which the lubricant is returned to the system. The manner of and means for lubricating the expander plug is explained below.

*Plug return mechanism.*—At the end of the forward stroke of the push bar 16, the expander plug 18, indicated in broken line in Figure 7, having passed through the backstop, normally comes to rest on the platform 151 of front elevator 37 located in front of the backstop and described in detail below. The speed and length of stroke of the push bar 16 is determined by the operation of push bar drive motor controlled by appropriate limit switches, not shown, the motor decelerating and stopping at the end of the push bar stroke by the action of regenerative braking. In order to prevent damage to the machine by overtravel of the plug and push bar in event of failure of the motor control to stop forward motion of these parts, an emergency stop device 153, see Figures 1 and 2, is provided ahead of front elevator 37 and in line with the push bar and plug. The stop device 153 is engaged by the plug during overtravel and prevents further movement of the plug and push bar. During normal operation, however, the expander plug 18 rests on front elevator platform 151 when the push bar is at the limit of forward movement. Thereafter drive motor and reducer 19 is reversed and the push bar is withdrawn rapidly to the rear to its starting position.

In order automatically to disconnect expander plug 18 from the front end of push bar 16, a stripper hook indicated at 155 in Figure 7 is mounted centrally on elevator platform 151 in alignment with the plug pass line so that the upper end of the hook normally extends slightly above and to the rear of the top surface of the raised platform as shown. Hook 155 is held in this position by a spring 156 housed under the platform and is depressed by the forwardly moving plug 18 as the latter slides over the upper end of the hook. As the plug comes to rest on the elevator platform and slightly ahead of the hook end, the latter springs up behind the plug and, upon retraction of the push bar, engages the rear face of the plug and strips the plug from the rearwardly moving push bar.

Platform 151 of front elevator 37 is lowered through actuation of suitable control switches and deposits the expander plug on conveyor 39 below the expander table, and the conveyor transfers the plug to rear elevator 40 at the opposite end of the expander table.

Conveyor 39, see Figures 3, 9 and 10, comprises a pair of laterally spaced chains 158 and 159 which engage pairs of sprockets 160 and 161 located at opposite ends of the expander table and supported within recess 41 in foundation F. One of these sprockets is rotated through a predetermined angular displacement once during each complete cycle of operation of the machine by a suitable motor, not shown, and moves the upper reach of the chains rearwardly a predetermined distance for each cycle of operation. Preferably a plurality of expander plugs 18, five as indicated, four being shown in broken lines in Figure 1, are used in the machine to enable immediate positioning of a plug ahead of the push bar as soon as the latter is returned to the starting position and therefore to permit continuous smooth operation of the machine. Four of the plugs are positioned on conveyor chains 158 and 159 when the conveyor indexes, and accordingly the distance which the chains move for each cycle of operation is approximately one quarter of the spacing between elevators 37 and 40.

As best shown in Figure 10, the upper reach of each of the pair of chains 158 and 159 is supported by rollers 163 mounted on the chain links and running on longitudinal rails 164 mounted on conveyor frame 165. Secured to and movable with chains 158 and 159 are a plurality of longitudinally spaced plug carriers 166, each comprising upwardly and outwardly flaring brackets 167 and 168 on which the expander plugs rest during transfer from the front to the rear elevators. Side rollers 169 on each bracket engage side rails on the conveyor frame to support and guide the sides of brackets 167 and 168. It will be noted there are no lateral connections between the opposed chains and conveyor brackets except through sprockets 160 and 161 and the intermediate space is open to permit the mechanism of elevators 37 and 40, described below, to move vertically through the conveyor for depositing and removing plug on and from the conveyor.

Elevators or transverse conveyors 37 and 40 are substantially identical in construction and accordingly one of them, namely, rear elevator 40, is described in detail herein. Referring to Figures 9 and 10, the elevator motor, comprising a vertically positioned hydraulic cylinder 170 and ram 171, extends upwardly from a recess 172 in the foundation F. Upon actuation of suitable control valves, not shown, in hydraulic lines connected to cylinder 170, the ram 171 reciprocates vertically between a lower position shown in solid line in Figure 9 to an upper position shown in broken line at 171' in Figure 9. The upper end of ram 171 is connected by pin 175 to the under side of an elevator platform 176 which supports the expander plug while it is raised into alignment with the push bar 16. Platform 176 has an elongated vertical guide flange 178 on its rear side, the right side as viewed in Figure 9, which engages and is vertically slidable along a guide post 180 secured to the base frame of the machine and extending from the conveyor to a point slightly below push bar 16. The width of platform 176 is less than the transverse spacing between the chains 158, 159 and between brackets 167 and 168 of each plug carrier 166, and hence the platform can move upwardly from its lower position below the vertically aligned carrier 166 on the upper reach of the conveyor to engage with the underside of a plug supported on the carrier and lift the plug vertically to the upper position shown in broken lines in Figure 9.

The expander plug 18, described in detail below, preferably is thimble-shaped with a pilot diameter at the front end of the plug smaller than the expanding ring diameter at the rear end of the plug. In order to properly position a plug of this shape on rear elevator 40 so that the bore of the plug through which the front end of the push bar extends is substantially concentric with the axis of the push bar when the plug is raised to the upper position, a spring supported pad 184 extends up from the front end of elevator platform 176 and engages the underside of a plug position plate 185 pivoted to rear end of the platform. Plate 185 inclines upwardly from its connection to the platform and supports each plug so that the bore of the plug is horizontal. The front end of plug position plate 185 therefore is resiliently supported through pad 184 by spring 187, the height of the pad being adjustable to permit plugs of different sizes to be properly positioned on the elevator. Preferably the upper surface 188 of plate 185 is V-shaped to retain the plugs upon the plate when the elevator is operated. The pivoted spring supported plate 185 may be omitted from the platform 151 of the front elevator 37 since there is no necessity of horizontally positioning the plugs on the front elevator.

In order further to insure that plugs being carried on the elevator do not roll sidewise, a pair of laterally spaced vertically extending guide plates 190, 191 are provided, see Figure 10. These are located forwardly and on opposite sides of post 180. These plates are supported on the base frame of the machine, extend from the conveyor 39 to the level of the push bar 16, and are laterally adjustable toward and away from each other to provide a small clearance between each plate and plugs of different diameters. Lateral adjustment of plates 190 and 191 is accomplished by upper and lower bell cranks 193, 194, respectively, connected to the backs of the plates and pivotally supported at 196, 197 on the base frame of the machine. The upper cranks are actuated by a common drive screw 198 having oppositely threaded ends which engage nuts 199 on the upper cranks. Screw 198 may be rotated in either direction by a manual adjusting shaft 200 connected through gear box 202 to the screw. As screw 198 is turned, upper bell cranks 193 pivot inwardly or outwardly to move plates 190 and 191 correspondingly. Vertical links 203 and 204 connecting the upper and lower cranks cause the lower bell cranks to pivot in unison with the upper bell cranks, and thus the guide plates are laterally adjusted in parallel planes. The guide plates are adjusted so as to be slightly spaced from the periphery of the plug being raised on the elevator, and thus lateral rolling of the plug while it is being raised is prevented.

The upper limit of movement of elevator platform 176 is controlled by the actuating of limit switch 205, see Figure 9, in the hydraulic circuit of ram cylinder 170, the limit switch being actuated by engagement with elevator platform 176 as the platform reaches its upper limit of movement. In order to adjust the upper limit of movement of the platform to accommodate different diameters of expander plugs, an adjusting screw 207 extends upwardly through guide post 180 and engages the limit switch at its upper end. The lower end of the adjusting screw 207 is connected by link 209 to an adjusting shaft 210 which is rocked about its axis by suitable manual adjustment means, not shown, at the side of the apparatus. As shaft 210 is rocked about its axis, link 209 moves adjusting screw 207 upwardly to properly position limit switch 205 to stop the hydraulic platform motor when the plug axis coincides with the axis of the push bar. The elevator 37 at the other end of the conveyor is generally similar to elevator 40 in all material respects.

In operation, with the push bar in the starting position and with an unexpanded pipe clamped on the expander table as shown in Figures 1 and 2, the platform of rear elevator 40 is in its raised position supporting an expander plug in axial alignment with the push bar, and front elevator 37 is in the lower position at approximately the elevation of the upper reach of conveyor 39. As the push bar advances to make the expanding stroke, it picks up the expander plug from elevator 40 and pushes the plug through the pipe. Rear elevator 40 is then lowered to conveyor 39 and conveyor 39 indexes and moves the plugs deposited thereon toward the rear elevator. When the forwardmost plug on the conveyor is offset sufficiently from the front elevator to clear it, the front elevator is raised into position to receive the plug being pushed through the pipe. The rear elevator reaches its lower position in advance of the arrival of the rear plug on the conveyor, and the conveyor stops with the latter plug in vertical alignment with the rear elevator platform. When the push bar is retracted and the plug is stripped from the bar and rests on the front elevator, the plug is lowered by the front elevator 37 to the conveyor. When the push bar has returned to its starting position as shown in Figures 1 and 2, the rear elevator, carrying a fresh plug, is raised to bring the plug into axial alignment with the push bar. The front elevator, having been lowered below the level of the conveyor, deposits the plug on the conveyor and the machine is ready for another cycle of operation.

*Push bar and expander plug.*—The push bar 16, see Figures 1, 2 and 11, preferably comprises a one piece heavy walled cylindrical steel tube having a diameter less than the diameter of the smallest pipe to be expanded. For example, in one apparatus embodying the invention, the pipe is 16" to 26" in expanded diameter and push bar 16 is 14" in diameter. The push bar is supported for reciprocation on the push bench 10 by a plurality of longitudinally spaced and fixed pairs of guide rollers 213. Each pair of rollers comprises vertically spaced upper and lower rollers having concavely shaped surfaces engaging the periphery of the push bar and journalled in support posts 214 secured to the base frames 14 and 15 of the machine on opposite sides of the push bar. The front end portion of the push bar is supported between similar guide rollers 215, see Figure 11, journalled in a travelling carriage 216 which moves along the front end of the push bench for a limited distance during the initial advancing movement and the final return movement of the push bar. The carriage 216 is described below.

The diameter of the push bar 16 is considerably smaller than the diameter of the expander plug. In order to support the front end of the push bar within the expanded pipe when the push bar is retracted after the plug has been disconnected therefrom, an elongated sleeve 218, see Figure 11, is removably mounted on the front portion of the push bar. Sleeve 218 preferably has an outside diameter slightly less than the maximum diameter of the expander plug, and is provided with annular front and rear flanges 219 and 220 which fit closely on the push bar. Rear flange 220 carries an annular ring 221 which engages a corresponding ring 222 on the push bar to locate the sleeve longitudinally on the push bar when the sleeve is assembled therewith. The sleeve is readily removable from the push bar, and sleeves of different diameters are provided for use with plugs and pipes of different diameters.

In order to position the plug 18 on the push bar, a spindle 223 is permanently secured by an enlarged portion 224 to the front end of the push bar and extends forwardly on the axis of the push bar through a bore in the plug 18. The enlarged portion 224 provides a shoulder that engages the rear face of the plug to transmit the thrust of the push bar to the plug and also to space the plug from the front flange 219 of push bar sleeve 218 to permit stripper hook 155 at the front elevator 37 to engage and disconnect the plug from the push bar.

In order to lubricate the expander plug and the interior of the pipe during the expanding operation, spindle 223 has an opening 225 at its forward end through which an elongated lubricant conduit 226 extends for connection to a nozzle 227 which projects beyond the front face of the plug as shown. The nozzle has a plurality of radial holes 228 from which lubricant carried by conduit 226 is sprayed outwardly and ahead of the plug. Conduit 226 extends from nozzle 227 through the entire length of the push bar 16 and connects to a source of lubricant supply at the rear of the machine. Lubricant is fed into conduit 226 as the expander plug enters the rear end of the cold pipe to be expanded, and the lubricant is sprayed from the nozzle 227 ahead of the expander plug to lubricate the plug and the interior of the pipe. The flow of lubricant is turned off when the expander plug passes out of the front end of the pipe, suitable controls being provided to turn the lubricant flow on and off automatically.

As shown in Figure 11, the expander plug 18 is a two-piece unit comprising a generally cylindrical nose 229 having a central axial bore 230 and a reduced rearwardly projecting annular hub 231 on which a hardened expander ring 232 is press fitted. The periphery of the ring tapers rearwardly and outwardly from a minimum diameter less than the internal diameter of the pipe before it is expanded to a maximum diameter at the rear of the ring which corresponds to the diameter to which the interior of the pipe is expanded. In the drawing, the amount of expansion taking place in the apparatus is exaggerated for convenience of illustration. The maximum diameter of the nose 229 of the plug is substantially the same as the minimum diameter of the tapered ring and accordingly the thrust force of the push rod is transmitted only through the expander ring 232 to the wall of the cold pipe to expand the pipe to the desired diameter. Ring 232 may be replaced when worn, without necessarily replacing the nose of the plug.

In order to support the sleeve, plug and forward end of the push bar, which may overhang a considerable distance in front of the first set of guide rolls 213, a travelling carriage 216 is provided. This supports the push bar at a point immediately behind sleeve 218 and rides forwardly on wheels 234 and 235, supported on tracks 236 and 237 when the push bar initially moves on its forward stroke and thus supports the push bar close to the rear end of pipe P. The carriage 216 moves between a rear position shown in Figure 2 to a forward position shown in Figure 11, with front carriage wheels engaging carriage stops 239 and 240. A counterweight, not shown, urges the carriage toward the forward position, and the rear end of sleeve 218 during the final part of the retracting movement of the push bar engages and moves the carriage to its rear position.

In order to cushion the impact between the rapidly moving sleeve 218 and the carriage, a collar 242 loosely fitted around the push bar is supported for reciprocation on the front end of the carriage. Pistons 243 on the rear of collar 242 and connected thereto by appropriate piston rods slide within hydraulic cushioning cylinders 244 mounted on opposite sides of the carriage, and springs in the cylinders urge the collar outwardly from the front of the carriage when the push bar is advanced. During final retracting movement of the push bar, sleeve 218 initially engages the collar 242 which, through pistons 243 and cylinders 244, cushions the impact and preserves the carriage from damage.

As mentioned above, lubricant conduit 226 extends through the entire length of the push bar 16 for connection to a source of lubricant. In order to provide a continuous connection between conduit 226 and the source of lubricant while the push bar is reciprocated longitudinally of the push bench during operation of the machine, conduit 226 is secured to and moves with the push bar and is connected at the rear of the push bar to one end of a flexible hose 247, see Figures 12 and 13, which is wound on a hose reel 249 at the rear end of the push bench. Reel 249 is mounted on a shaft 250 journalled in bearings 251 on upright frame members 252 which are connected to the base frame of the push bench. The reel is rotated through a gear box 254 by a sprocket 255, chain 256 and a driving sprocket 257 mounted on an extension of shaft 259 on which drive chain idler sprockets 23 and 23' of the push bar drive mechanism are mounted. Lubricant is fed from a pump, not shown, through a fitting 261 connected to reel shaft 250 and passes through the shaft to the other end of the hose 247.

Rotation of reel 249 is synchronized with longitudinal movement of the push bar so that hose 247 is fed from and to the reel at the same rate that the push bar is advanced and retracted. Thus fluid communication between conduit 226 and the source of lubricant is continuous, and the lubricant is carried to the front end of the expanding plug at all times during the pipe expanding operation.

As best shown in Figure 2, the main drive motor and reducer 19 are located adjacent the front end of push bench and rotate the pair of drive sprockets 20 and 20' journalled on push bench base. Push bar drive chains 22 and 22' which engage the sprockets have their upper reaches stressed in tension while the push bar is moved forwardly on the expanding stroke. The rear end of push bar 16 is connected to drive chains 20 and 20' by a yoke plate 263, see Figures 12 and 14, which is mounted within and projects laterally from an open sided extension 264 on the end of the push bar. The projecting ends 266 of the yoke plate are secured respectively to drive chains 22 and 22' by pins 268 and transmit the pull of these chains directly to the push bar.

It will be noted that the upper reaches of chains 22 and 22' lie in a horizontal plane that is substantially midway between the upper and lower push bar guide rollers 213 of each pair of rollers, that is, the horizontal plane of the push bar axis, and that these parts of the chains are disposed closely to the push bar. This arrangement permits balanced transmission of the pull forces from the chains to the push bar.

*Summary of operation.*—Automatic operation of the apparatus described above is afforded by limit switches, solenoid valves and other control devices which control the electric, pneumatic and hydraulic circuits to which the various drive motors or moving parts of the apparatus are connected. No claim is made in this patent to the control per se, and accordingly specific descriptions of the control components and circuits have been omitted. Each cycle of operation of the machine beginning with the loading of a fresh length of pipe into the machine and ending with discharge of the expanded pipe to the exit skid is entirely automatic. Preferably the machine automatically stops at the end of each cycle and is started manually by the operator. In addition, manual control for each of the various motors in the apparatus is preferably provided to permit individual control of the moving parts for initial set-up of the machine, for inspection and testing of the apparatus or whenever such operation is desired. The chart shown in Figure 15 illustrates the sequence of operation of the apparatus.

At the beginning of each cycle of operation the positions of the parts of the apparatus are as follows: Push bar 16 and travelling carriage 216 are in their extreme rear positions respectively on the push bench 10. Platform 176 of rear elevator 40 is raised and supports one of the expander plugs 18 in axial alignment with the push bar. Jaws 30 of the several pipe clamps 25, 26, 27 and 28 on the expander table are open to receive a fresh length of pipe P. Pipe lift arms 32 are raised to the level of entry skids 33 and the inner legs 86 of the pipe stop and release levers 84, see Figure 3, are raised to hold the pipes on the skids.

The retractable backstop sleeve 100, carrying backstop elements 36, is fully extended rearwardly of the backstop frame 95. Platform 151 of front elevator 37 is in the lowered position on a level with plug return conveyor 39. Another plug is supported on the upper reach of conveyor 39 in vertical alignment with the front elevator platform 151, and three additional plugs are spaced longitudinally along the conveyor at intervals equal to one quarter the distance between front elevator 37 and rear elevator 40.

The machine is started by the operator through actuation of a starting button, and the following operations occur in sequence, see Figure 15: Pipe stop levers 84 are rocked in a clockwise direction by cylinder 89, causing the first pipe on the entry skids above the levers to be positively moved onto the pipe lift arms 32. The lift arms 32, actuated by motor 69, lower the pipe thereon between the open pipe clamp jaws, the front end of the pipe being spaced slightly rearwardly of the extended backstop elements 36 as shown in Figures 1 and 2. Pipe clamp motors 55 then close jaws 30 progressively from the rear to the front of the expander table to align the pipe on a straight line, and back stop elements 36 are extended.

The push bar drive motor is energized and moves the push bar 16 forwardly to engage and move expander plug 18 from the rear elevator platform 176 into the rear end of the clamped pipe. Immediately upon engagement of the expander plug in the pipe, the forward movement of the push bar pushes the pipe forwardly within the clamp jaws until the front end of the pipe seats tightly against the backstop shoes 124. At this time, the plug lubricant is turned on and is sprayed against the interior of the pipe ahead of the forwardly moving plug. While the plug is progressing through the pipe, the rear elevator platform 176 is lowered to conveyor 39, the conveyor moves the expander plugs thereon rearwardly one-quarter of the distance between the elevators until the rear plug is vertically aligned with and above rear elevator platform 176. Simultaneously, front elevator platform 151 is raised to its upper position.

Forward movement of the push bar and expander plug is continuous throughout the length of the pipe, the plug 18 expanding the pipe outwardly to predetermined diameter substantially adjacent the clamp jaws and finally emerging from the end of the pipe, at which time the plug lubricant is turned off. As the plug passes through the front end of the pipe and into the backstop, backstop elements 36 yield and move radially outwardly, permitting plug 18 and push bar sleeve 218 to pass through the backstop. As the plug approaches platform 151 of front elevator 37, the push bar drive motor 19 is decelerated by regenerative braking and the motor is stopped when the plug is positioned centrally on front elevator platform 151.

The push bar drive motor is then reversed and rapidly moves the push bar to the rear. The plug on the front elevator is disconnected from the end of the push bar by hook 155, and, as the push bar is moving rearwardly, is lowered by the front elevator to conveyor 39. As the push bar approaches its starting position, the drive motor decelerates and finally stops with the push bar in its starting position behind rear elevator 40.

The rear elevator platform 176 is then raised and lifts the fresh plug from conveyor 39 to the upper position in axial alignment with the push bar. Simultaneously the pipe clamp jaws 30 are opened and the backstop elements 36 are moved forwardly away from the front end of the pipe. Lift arms 32 then raise the pipe which rolls from the lift arms to the exit skids 34. The lift arms then drop to the loading position on a level with the entry skids 33, and the apparatus is stopped with the parts thereof in position to begin another cycle of operation.

Apparatus embodying the present invention has been constructed and operated successfully to expand cold pipe measuring 30 to 47 feet in length and 16 to 26 inches in expanded outside diameter, the amount of expansion being 2% to 6% of the outside diameter of the pipe.

By way of example, apparatus designed to expand such pipe according to present invention has a base frame approximately 155 feet long and uses a 1500 horsepower push bar drive motor and a chain capable of developing a thrust force of 300,000 pounds on the push bar. The expander plug is pushed through the cold pipe at speeds up to 270 feet per minute, and the time T in seconds, see Figure 15, for a complete cycle of operation, starting with the loading of an unexpanded pipe and ending with the discharge of the expanded pipe, is approximately 50 seconds for 16 inch O.D. pipe and is less than 60 seconds for 26 inch O.D. pipe.

An important factor contributing to the speed of operation is the arrangement of the apparatus so that pipe being processed is moved to and from the machine transversely of the axis of the pipe length and of the pass line of the expander plug. The loading and unloading movements are thus relatively short and accordingly the loading and unloading of pipe can be performed rapidly and the output of the machine correspondingly increased.

Furthermore, the loading and unloading arrangement conserves space required in the pipe production line since the processing stations preceding and following the expanding station may, if desired, be located immediately adjacent the sides of the expander table and need not be positioned in longitudinal alignment with the expanding machine.

The cold working resulting from expanding the pipe in one continuous rapid motion greatly increases the physical strength of the pipe without, however, appreciably diminishing the wall thickness. For example, cold pipe expanded in accordance with the present invention is capable of withstanding pressures 15% to 20% greater than the maximum pressure which unexpanded pipe can withstand. The increased strength is achieved without change in the composition of the steel as by addition of manganese or other alloying constituents which would affect weldability of the pipe.

It is intended that the patent shall cover, by summarization in the appended claims, all features of patentable novelty residing in the invention.

We claim:

1. Apparatus for expanding pipe comprising in combination, a frame, a longitudinally reciprocable bar supported on said frame, means for non-rotatably supporting a pipe in fixed position on said frame and in axial alignment with said bar, a plug having a diameter greater than the inside diameter of said pipe, means for supporting the plug adjacent the entry end of said pipe, said plug being connectable to one end of said bar adjacent the entry end of said pipe, means for moving said bar in one direction through said pipe and for retracting said bar in the opposite direction while said pipe remains stationary, said plug being connected to said bar during movement of the bar in said one direction for expanding said pipe, means for disconnecting said plug from said bar during initial movement of the bar in said opposite direction, means for receiving the plug at the exit end of the pipe, and mechanical conveyor means for returning the plug exteriorly of said pipe from the exit end thereof to said means for supporting the plug adjacent the entry end of said pipe.

2. In an apparatus of the type described, an elongated base frame comprising a push bench and a pipe expander table, a push bar supported on the push bench for longitudinal reciprocating movement, a plurality of guide rolls longitudinally spaced along said push bench for supporting said push bar, means for reciprocating said push bar on said push bench, a carriage for supporting the forward end of said push bar in alignment with a pipe to be expanded, a series of pipe engaging clamps carried by said pipe expander table and adapted to support a pipe on said pipe expanding table in alignment with said push bar, a pipe expander plug adapted to be pushed through said pipe by said push bar, a rear platform for supporting said plug between the forward end of said push bar and the adjacent end of said pipe, a backstop at the end of said pipe remote from said push bar adapted to hold the pipe stationary against the forces exerted on said pipe by said push bar and said plug, said backstop being expansible to permit the passage of said plug therethrough at the conclusion of an expanding operation, a front platform adapted to receive said plug after it has passed through said backstop, and means for transferring said plug exteriorly of said pipe from said front platform to said rear platform.

3. Apparatus for expanding pipe comprising an elongated frame, a push bar supported on part of said frame for reciprocable movement longitudinally of the frame, means on another part of said frame for releasably and non-rotatably holding a pipe in alignment with the axis of said push bar, a backstop at the end of said pipe remote from said one part of the frame for holding said pipe stationary against thrust exerted by said push bar, said backstop having radially expansible pipe engaging parts having surfaces substantially normal to the axis of the pipe and adapted to engage the end surface of the pipe and having a bore aligned with the axis of said pipe, a pipe expanding plug engageable with the end of said push bar adjacent said pipe, means for pushing said push bar and said plug through said pipe and through said backstop and for withdrawing said push bar, said radially expansible pipe engaging parts being moved radially outwardly by said plug as said plug is pushed through said backstop, and means for moving said backstop longitudinally away from said end of the pipe to permit the pipe to be removed from the apparatus in a transverse direction.

4. Pipe expanding apparatus comprising means for holding a pipe on an axis, an expander plug having a diameter larger than the inside diameter of the pipe, means for pushing said plug through the pipe from one end to the other to expand the pipe, a backstop against which the other end of the pipe abuts, said backstop having a central bore with a diameter larger than the maximum diameter of said plug and having a plurality of radial elements arranged concentrically of said axis, said elements being radially movable and projecting radially inwardly of said bore and having surfaces substantially normal to the axis of the pipe and engaging said other end of the pipe, and means for moving said backstop longitudinally away from said other end of the pipe to permit the pipe to be removed from the apparatus in a transverse direction.

5. Pipe expanding apparatus comprising means for holding a pipe on an axis, an expander plug having a diameter larger than the inside diameter of the pipe, means for pushing said plug through the pipe from one end to the other to expand the pipe, and a backstop against which the other end of the pipe abuts, said backstop having a central bore with a diameter larger than the maximum diameter of said plug and having a plurality of radial elements arranged concentrically of said axis, said elements being radially movable and projecting radially inwardly of said bore and having surfaces substantially normal to the axis of the pipe and engaging said other end of the pipe, and means to shift said elements axially away from said pipe.

6. Apparatus for expanding pipe comprising a base frame, means movable laterally of the pipe for immovably supporting it on an axis extending longitudinally of said frame, plug means having a diameter larger than the inside diameter of the pipe, means for supporting said plug means at one end of and in axial alignment with said pipe, means for pushing said plug means axially through said pipe to the other end thereof, and a backstop at said other end of said pipe for resisting axial movement of said pipe comprising a backstop frame axially fixed on said base frame and having a bore axially aligned with said pipe, a sleeve slidably telescoped within said bore, a plurality of radially yieldable elements on said sleeve normally positioned concentrically of said axis and extending radially inwardly of said sleeve, said elements having seats engaged by said other end of the pipe and being expandable outwardly with said other end of the pipe when said plug means passes therethrough, means to lock said sleeve in one axial position relative to said backstop frame with said elements in engagement with the pipe, and means to unlock and to move said sleeve to another axial position relative to said backstop frame whereby to space said elements from said other end of the pipe.

7. Apparatus for expanding pipe comprising a frame, means for holding a pipe in longitudinally fixed and stationary position on said frame, an expander plug, means for supporting said plug adjacent one end of said pipe, means for pushing said plug through the entire length of said pipe beyond the other end of said pipe, and plug transfer means for returning said plug exteriorly of said pipe to said one end of said pipe comprising a longitudinal conveyor extending parallel to said frame, and transverse conveyors for moving said plug between said longitudinal conveyor and the pass line of the plug through said pipe.

8. Apparatus according to claim 7 wherein a plurality of plugs are provided, said plugs being substantially equally spaced on said longitudinal conveyor, and said longitudinal conveyor being actued step-by-step to move the plugs thereon relative to said frame through a distance equal to the spacing between the plugs.

9. Apparatus for expanding pipe comprising a frame, means for supporting said pipe in longitudinally fixed position on said frame, an expander plug having a diameter greater than the inside diameter of said pipe, means for pushing said plug from a position adjacent one end of the pipe through the pipe and beyond the opposite pipe end, and plug transfer means for returning said plug to said one end of the pipe comprising a conveyor coextensive with and located below said pipe supporting means, and elevators at opposite ends, respectively, of said pipe, each elevator having a plug support platform vertically movable between said conveyor and the adjacent end of said pipe, said conveyor comprising a plurality of longituidnally spaced plug carriers, each carrier having laterally spaced plug supporting parts, the platforms of said elevators being narrower than and being vertically aligned with the space between said parts of each of said carriers whereby they are movable between said carrier parts for depositing said plug on and removing said plug from said carriers.

10. The apparatus according to claim 9 with adjustable laterally spaced guide plates on opposite sides of said platform of each elevator, said guide plates extending vertically from the conveyor to a point above the upper limit of vertical movement of said platform and normally being closely spaced from the periphery of said plug on said platform.

11. Apparatus for expanding pipe comprising an elongated frame, a push bar supported on one part of said frame for reciprocable movement longitudinally of the frame, means on another part of said frame for releasably holding a pipe in alignment with the axis of said push bar, a backstop at the end of said pipe remote from said one part of the frame, said backstop having radially expansible pipe engaging part and having a bore aligned with the axis of said pipe, a pipe expanding plug engageable with the end of said push bar adjacent said pipe, means for pushing the forward end of said push bar and said plug through said pipe and through said backstop and for withdrawing said push bar, means for disconnecting said plug from said push bar when said plug is beyond the backstop, a longitudinal conveyor adjacent said other part of the frame, a front transverse conveyor means beyond said backstop for transferring said plug to said longitudinal conveyor, and a rear transverse conveyor at the adjacent ends of said one part and said other part of the frame for transferring the plug from said longitudinal conveyor into axial alignment with said push bar.

12. In an apparatus of the type described, an elongated base frame comprising a push bench and a pipe expander table, a push bar supported on the push bench for longitudinal recirpcating movement, a plurality of pairs of guide rolls mounted on said push bench for supporting said push bar, said guide rolls in each pair having vertically spaced horizontal axes, a pair of chains mounted on said push bench for reciprocating said push bar and means for driving said chains, the upper reaches of said chains lying in a horizontal plane disposed substantially midway between the axes of said guide rolls, and means carried by said pipe expander table for supporting a pipe on said pipe expander table in alignment with said push bar.

13. In an apparatus of the type described, an elongated base frame comprising a push bench and a pipe expander table, a push bar supported on the push bench for longitudinal reciprocating movement, a plurality of pairs of guide rolls mounted on said push bench for supporting said push bar, said guide rolls in each pair having vertically spaced horizontal axes, a pair of chains mounted on said push bench for reciprocating said push bar and means for driving said chains, the upper reaches of said chains lying in a horizontal plane disposed substantially midway between the axes of said guide rolls, a carriage movable along said push bench for supporting the forward end of said push bar in alignment with a pipe to be expanded, and means carried by said pipe expander table for supporting a pipe on said pipe expanding table ing in alignment with said push bar.

14. Apparatus for expanding pipe comprising a frame, a longitudinally reciprocable bar supported on said frame, means for supporting a pipe in fixed position on said frame in axial alignment with said bar, a plug having a maximum diameter greater than the inside diameter of said pipe detachably connectable with one end of said bar adjacent said pipe, a sleeve concentrically and fixedly mounted on said bar adjacent said one end of the bar, said sleeve having an outside diameter not greater than the maximum diameter of said plug, reversible drive means for moving said bar in one direction to pass said one end of the bar, said sleeve and said plug through the entire length of said pipe and beyond the remote end of the pipe whereby to expand the pipe, means to disconnect said plug from said one end of the bar beyond the remote end of the pipe, said reversible drive means returning said bar in the opposite direction through said pipe with said sleeve engaging the interior of the expanded pipe to support said one end of the bar.

References Cited in the file of this patent

UNITED STATES PATENTS

| | | |
|---|---|---|
| 377,717 | Kline | Feb. 7, 1888 |
| 1,011,193 | Hackney | Dec. 12, 1911 |
| 1,162,772 | Henderson | Dec. 7, 1915 |
| 1,431,883 | Fell | Oct. 10, 1922 |
| 1,469,565 | Mauck | Oct. 2, 1923 |
| 2,006,336 | Diescher | July 2, 1935 |
| 2,071,208 | Korbully | Feb. 16, 1937 |
| 2,089,119 | Irven | Aug. 3, 1937 |
| 2,167,424 | Novack | July 25, 1939 |
| 2,263,744 | Smith | Nov. 25, 1941 |
| 2,324,982 | Kuhn | July 20, 1943 |
| 2,336,524 | Bannister | Dec. 14, 1943 |
| 2,343,890 | Dewald | Mar. 14, 1944 |

(Other references on following page)

UNITED STATES PATENTS

| | | |
|---|---|---|
| 2,391,908 | Knudsen | Jan. 1, 1946 |
| 2,439,122 | Baker | Apr. 6, 1948 |
| 2,583,834 | Gross | Jan. 29, 1952 |
| 2,667,136 | Reichl | Jan. 26, 1954 |
| 2,702,130 | Grau | Feb. 15, 1955 |
| 2,726,704 | Fischer | Dec. 13, 1955 |
| 2,736,361 | Kocks | Feb. 28, 1956 |
| 2,751,781 | McConnell | June 26, 1956 |

FOREIGN PATENTS

| | | |
|---|---|---|
| 532,598 | Great Britain | Jan. 28, 1914 |
| 448,727 | Germany | Aug. 29, 1927 |
| 686,688 | Germany | Jan. 13, 1940 |